United States Patent
Cioffi et al.

[11] Patent Number: 5,676,738
[45] Date of Patent: Oct. 14, 1997

[54] VOC CONTROL/SOLVENT RECOVERY SYSTEM

[76] Inventors: Lawrence Cioffi, 2166 Morrow Ave., Niskayuna, N.Y. 12309; Harold R. Cowles, 9355 N. 91st St., #120, Scottsdale, Ariz. 85258

[21] Appl. No.: 517,777

[22] Filed: Aug. 22, 1995

[51] Int. Cl.⁶ ................................................ B01D 53/12
[52] U.S. Cl. ........................ 95/109; 95/111; 95/143; 96/123; 96/130; 96/144; 96/150
[58] Field of Search ............... 95/107–111, 143–147; 96/108, 121–123, 126–132, 144, 150

[56] References Cited

U.S. PATENT DOCUMENTS

| | | | |
|---|---|---|---|
| 2,397,566 | 4/1946 | Schutte | 96/123 |
| 2,590,322 | 3/1952 | Imhoff et al. | 96/126 X |
| 2,664,967 | 1/1954 | Molstedt | 96/131 X |
| 3,023,836 | 3/1962 | Kasbohm et al. | 96/126 X |
| 4,046,530 | 9/1977 | Izumo et al. | 96/123 |
| 4,047,906 | 9/1977 | Murakami et al. | 96/131 X |
| 4,061,477 | 12/1977 | Murakami et al. | 55/79 |
| 4,147,523 | 4/1979 | Izumo | 96/126 |
| 4,149,023 | 4/1979 | Mizuno et al. | 96/126 |
| 4,207,082 | 6/1980 | Okamoto et al. | 55/60 |
| 4,259,094 | 3/1981 | Nagai et al. | 96/123 |
| 4,859,216 | 8/1989 | Fritsch | 96/126 X |
| 4,869,734 | 9/1989 | Jacquish | 96/144 X |
| 4,902,311 | 2/1990 | Dingfors et al. | 96/150 X |
| 5,176,798 | 1/1993 | Rodden | 96/122 X |
| 5,304,234 | 4/1994 | Takatsuka et al. | 96/123 X |
| 5,383,955 | 1/1995 | Neal et al. | 96/123 X |
| 5,389,125 | 2/1995 | Thayer et al. | 96/122 X |
| 5,496,395 | 3/1996 | Yamazaki | 96/123 |

FOREIGN PATENT DOCUMENTS

| | | | |
|---|---|---|---|
| 52-002867 | 1/1977 | Japan | 96/127 |
| 58-173323 | 10/1983 | Japan | 96/127 |

*Primary Examiner*—Robert Spitzer
*Attorney, Agent, or Firm*—Hugh D. Jaeger

[57] ABSTRACT

A new synthetic, pyrolized, spherical adsorbent, with a moving or fluidized bed VOC control/solvent recovery system, also described as a control/solvent recovery system.

18 Claims, 4 Drawing Sheets

VOC CONTROL/SOLVENT RECOVERY SYSTEM

BACKGROUND OF THE INVENTION

1. Field of the Invention

The present invention is for solvent vapor control, solvent recovery, and air pollution control.

2. Description of the Prior Art

Kureha Chemical Industries of Tokyo, Japan, has had patents on moving bed solvent recovery systems. These patents have now expired. These patents were based on a beaded form of a natural carbon source, petroleum pitch. The distinction with the current invention is the use of higher performing, synthetic ion exchange resin, a new product.

Chemateur of Sweden has moving bed systems based on another type of non-pyrolized synthetic resin. This material has a more limited applicability and suffers from physical attrition.

SUMMARY OF THE INVENTION

The general purpose of the present invention is for volatile organic compound (VOC) control.

According to one embodiment of the present invention, there is provided a fluid bed system, including a continuous solvent adsorption section, continuous desorption section, and a condensation section. This embodiment includes this hardware in conjunction with a newly developed synthetic pyrolized carbonaceous adsorbent.

One significant aspect and feature of the present invention is continuous solvent vapor control through fluid or moving bed adsorption.

Another significant aspect and feature of the present invention is the use of a new pyrolized, synthetic, spherical bead or pellet adsorbent to achieve practical fluid bed operation.

Yet another significant aspect and feature of the present invention is the option to use the invention as a pre-concentrator prior to oxidation.

Still another significant aspect and feature of the present invention is the use of fluid bed adsorption, with fluid bed desorption as a pre-concentration device.

A further significant aspect and feature of the present invention is the use of the basic fluid bed adsorber and moving bed desorber as a concentrator device, followed by in-situ or ex-situ VOC destruction using ozone and ultraviolet light, known as UV-ozonation.

A further significant aspect and feature of the present invention is the blending of the pyrolized carbon pellets with other absorption media, such as silica gel or polymeric absorber or carbon pellets.

Having thus described embodiments of the present invention, it is the principal object of the present invention to provide a VOC control/solvent recovery system.

One object of the present invention is recovery of solvent from contaminated air.

Another object of the present invention is concentration of solvent vapor from contaminated air, followed by oxidation of concentrated desorbate.

Yet another object of the present invention is using a second fluid bed section for desorption, in place of the primary embodiment which uses a packed bed desorber. In this case, a typical embodiment would include an oxidizer for final destruction.

Yet another object of the present invention is the use of ozone and ultraviolet light as a final destruction mechanism.

Typical applications of the various forms of the invention include, but are not limited to, industrial air contamination of all types, soil remediation projects, water remediation projects, any other processes or conditions for which control of airborne solvent is required.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
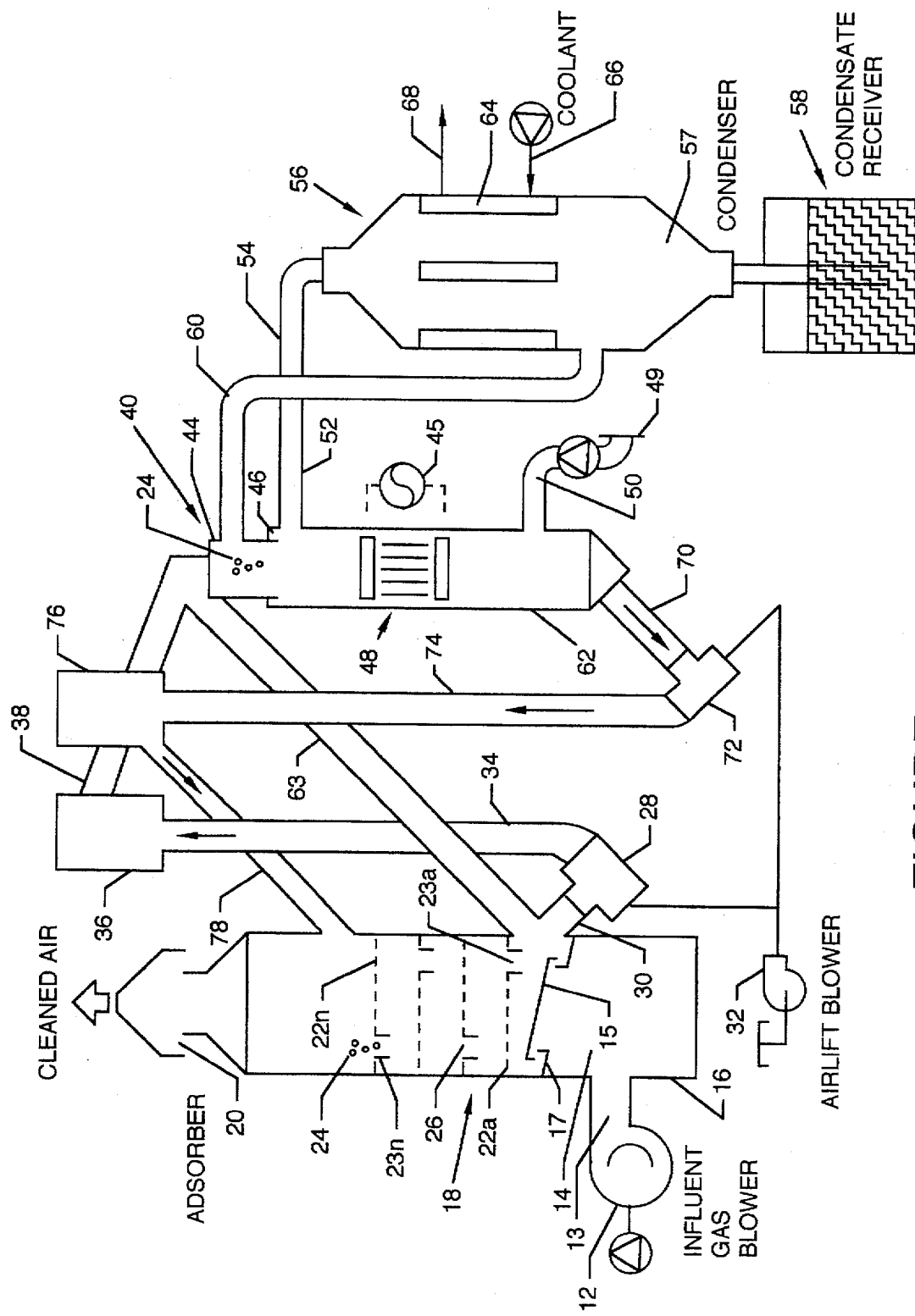
FIG. 1 illustrates a basic system with fluid bed adsorber, moving bed desorber, and condensation.

FIG. 1 illustrates the overall novel concept incorporating the use of a new spherical, pyrolized, synthetic carbonaceous adsorbent in a fluidized bed or moving bed volatile organic compound (VOC) control and/or recovery system. The type of adsorbent is exemplified by, but not limited to, adsorbents such as Rohm and Haas "Ambersorb 563" and, in particular, "Ambersorb 600," is one suitable form of the product for this application.

The general concept is described in FIG. 1, which incorporates a fluid bed adsorber to collect the solvent vapors, transfer pipes, a moving bed desorber to regenerate the adsorbent, and a condenser to recover the concentrated VOC's from the desorbate stream. This configuration provides continuous VOC control and recovery.

A process gas blower 12, soil vapor extraction blower, air stripping tower blower, or other such contaminated air source blower, conveys contaminated air stream 13 having contaminated process gas vapors 14 at a constant rate into the lower region 16 of the moving bed adsorber 18 known also as a multi-stage fluid bed adsorber or simply as an adsorber. The adsorber 18 generally is a vessel having several input and/or output ports and an upper vent 20 which allows cleansed air to exit the interior of the adsorber 18.

The contaminated air 13 flows upward through a covered vent 15 located on a slanted gravity feed plate 17 in the lower region 16 and through a plurality of horizontally aligned sieve trays 22a–22n. There can be from 1 to 20 sieve trays, for purposes of example and illustration, in the adsorber 18, depending upon the characteristics of the process gas being treated. A fresh supply of synthetic, pyrolized adsorbent in the form of pellets 24 is provided and is evenly distributed on all the sieve trays 22a–22n. Air passing upwardly through the sieve trays 22a–22n suspends the adsorbent pellets 24 in a moving or fluidized bed 26. The contaminated air intimately contacts all adsorbent pellets 24, simultaneously creating the fluid bed and providing for removal of the solvent vapors in the air stream. The sieve trays 22a–22n each have passageways 23a–23n which allow downward passage of the adsorbent pellets 24 successively from the upper sieve tray 22n to lower sieve trays, thus creating structure which allows the adsorbent pellets 24 to be suspended and flow across the upper surface of each sieve 22n–22a and downwardly to each successive sieve layer through the passageways 23a–23n in a fashion and manner described herein as a moving or fluidized bed 26. The sieves 22a–22n are designed to provide proper air flow and adsorbent pellet distribution such that efficient solvent vapor collection takes place in the adsorber 18.

As the contaminated air 13 passes through each sieve tray 22a–22n, VOC's (volatile organic compounds) are collected on the downward moving synthetic adsorbent pellets 24. After passing through the final tray 22n of the adsorber 18, the cleansed air exits the top of the adsorber 18 through the vent 20.

Spent adsorbent pellets 24, which have traveled completely across each sieve tray 22n–22a, collect on the gravity feed slanted plate 17 in the adsorber lower region 16. The spent adsorbent pellets 24 flow from the gravity feed slanted plate 17 downwardly into pipe section 28 through interceding drain pipe 30.

An air lift blower 32 connects to the bottom of pipe section 28 creates a steady flow of air in transfer pipe 34. As spent adsorbent pellets 24 drain or flow into the pipe section 28 through drain pipe 30 from the moving bed adsorber 18, it is entrained in the air stream created by pneumatic transport blower 32, and thus pneumatically conveyed upwardly to be deposited in a chamber 36 at the upper end of the transfer pipe 34.

A transfer tube 38, assisted by gravity and forced air from the pneumatic transport blower 32, delivers volatile organic compound-laden pellets 24 to the moving bed desorber 40. The moving bed desorber 40 components include an upper chamber 44, a heat exchanger 46, a heat transfer device 48, a lower chamber 62, and various inputs and outputs plumbed to components of the moving bed desorber 40. The adsorbent pellets 24 flow downwardly through transfer pipe 38 into a chamber 44 at the upper end of a heat exchanger 46. The majority of the adsorbent pellets 24 are received into the heat exchanger 46 and are heated in the heat exchanger 46 to release the concentrated solvent vapors collected in the moving bed adsorber 18. If an over supply of adsorbent pellets 24 is supplied to the upper chamber 44 by transfer pipe 38, the excess pellets 24 are carried by transfer pipe 63 to the region of the moving bed adsorber 18 to be once again conveyed upwardly through transfer pipe 32 to the upper chamber 44 for processing. The heat exchanger 46 can be of various designs, including, but not limited to, tube and shell, fin tube, plate heaters, electric heating elements of various designs, or other suitable designs. The heat source 45 for heat exchanger 46 can be steam, liquid hot oil, hot oil vapor, electrical heating elements, flue gas, microwave energy, connected to a heat transfer device 48 about the heat exchanger 46.

As the adsorbent 24 is heated and solvent is desorbed, a small flow of carrier gas 49 is introduced to the lower region 62 of the heat exchanger 46 through pipe 50. The carrier gas 49 flows upwardly through the downwardly proceeding bed of adsorbent pellets 24 in the heat exchanger 46, thus removing the concentrated, desorbed vapors which are purged from the pellets 24 by the heat of the heat exchanger 46 to exit the desorption heat exchanger 46 through desorbate pipe 52.

The carrier gas 49 source can be air, nitrogen, inert gas of any type, flue gas, or other gaseous materials. In the case of flue gas, the flue gas can be controlled for low oxygen content, and can be temperature controlled by heat exchanger or water injection.

Desorbate pipe 52 coveys a stream of gaseous concentrated desorbate solvent 54 into a condenser 56. Liquified recovered solvent 57 drains into a collection vessel 58. The carrier gas stream 49 flows from the condenser 56 by way of carrier gas return pipe 60 attached to the lower region of the condenser 56. Carrier gas return pipe 60 conveys the carrier gas 49 back to the chamber 44 at the top of the moving bed desorber 40. Optionally, the carrier gas 49 can be recycled or vented. A coolant coil 64, having a coolant input 66 and coolant output 68, aligns in the condenser 56.

Regenerated synthetic adsorbent pellets 24 flow downward out of heat exchanger 46 and into the bottom chamber 62 of the moving bed desorber 40. As an option, an adsorbent cooler section can be incorporated into the regenerator bottom section.

Regenerated adsorbent pellets 24 flow out of the moving bed desorber 40 chamber 62 and into a chamber 28 by way of adsorbent drain pipe 70. Air lift blower 32 creates a steady flow of air flowing into a chamber 72 and adsorbent transfer pipe 74. As regenerated adsorbent 24 flows out of drain pipe 70, it is entrained in the airstream of transfer pipe 74. The adsorbent 24 is pneumatically transferred to a chamber 76 at the upper end of transfer tube 74 and to adsorber 18 via transfer pipe 78 to be placed on the top sieve tray 22n to once again perform the task of cleansing upwardly passing air. The synthetic adsorbent pellets 24 are thus recycled for collection of solvent vapors on a continuous basis.

FIRST ALTERNATIVE EMBODIMENT

Figure 2:
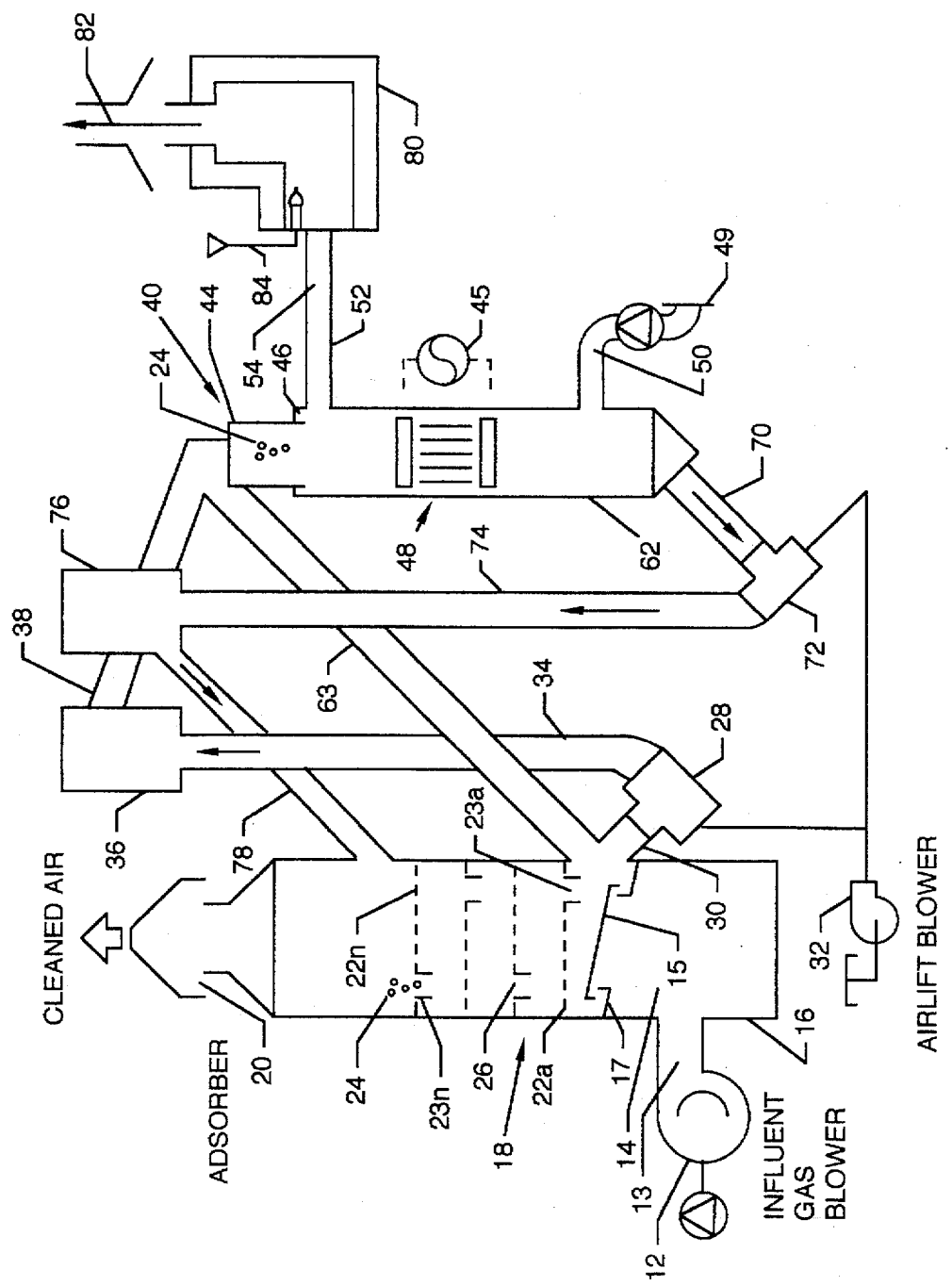
FIG. 2 illustrates a variation of FIG. 1 in which an oxidizer is used instead of a condenser. Desorbate is destroyed rather than being recovered.

FIG. 2, a first alternative embodiment, illustrates the use of the fluid bed adsorber 18, the moving bed desorber 40, and transfer pipes 34 and 74 and associated components, in conjunction with a small oxidizer 80 which replaces the condenser 57 previously described in FIG. 1. The highly concentrated desorbate stream in desorbate pipe 52 is directed from the moving bed desorber 40 to the small oxidizer 80, in which the solvents (VOC's) are destroyed. The heat from the oxidized solvents is used as an energy source for desorption.

Desorbate pipe 52 carries the concentrated solvent vapor stream to an oxidizer 80. The concentrated gaseous desorbent solvent vapors 54 are economically destroyed in the oxidizer 80. The purified air exits the oxidizer 80 as flue gas 82. Supplemental fuel 84 can be added to the oxidizer 80 if the solvent vapor heat values cannot sustain the oxidizer temperature at appropriate levels.

An option of this design is to use the hot flue gas 82 to provide energy for desorption. This can be achieved through direct use of the flue gas, with the temperature being regulated by a gas-to-gas heat exchanger and/or water mist injection (not illustrated). In addition, the flue gas can be blended with air at variable ratios to provide proper temperature control. In either case, the oxygen content of the flue gas 82 can be regulated by appropriate control of combustion air in the oxidizer 80.

Alternatively, the flue gas can be used to produce steam or to heat water, liquid heat transfer oil, or to produce hot oil vapor. Any of these can be then used as an energy source for desorption.

These energy sources can be used to heat or supplement the heat exchanger 46 and/or the carrier gas 49.

SECOND ALTERNATIVE EMBODIMENT

Figure 3:
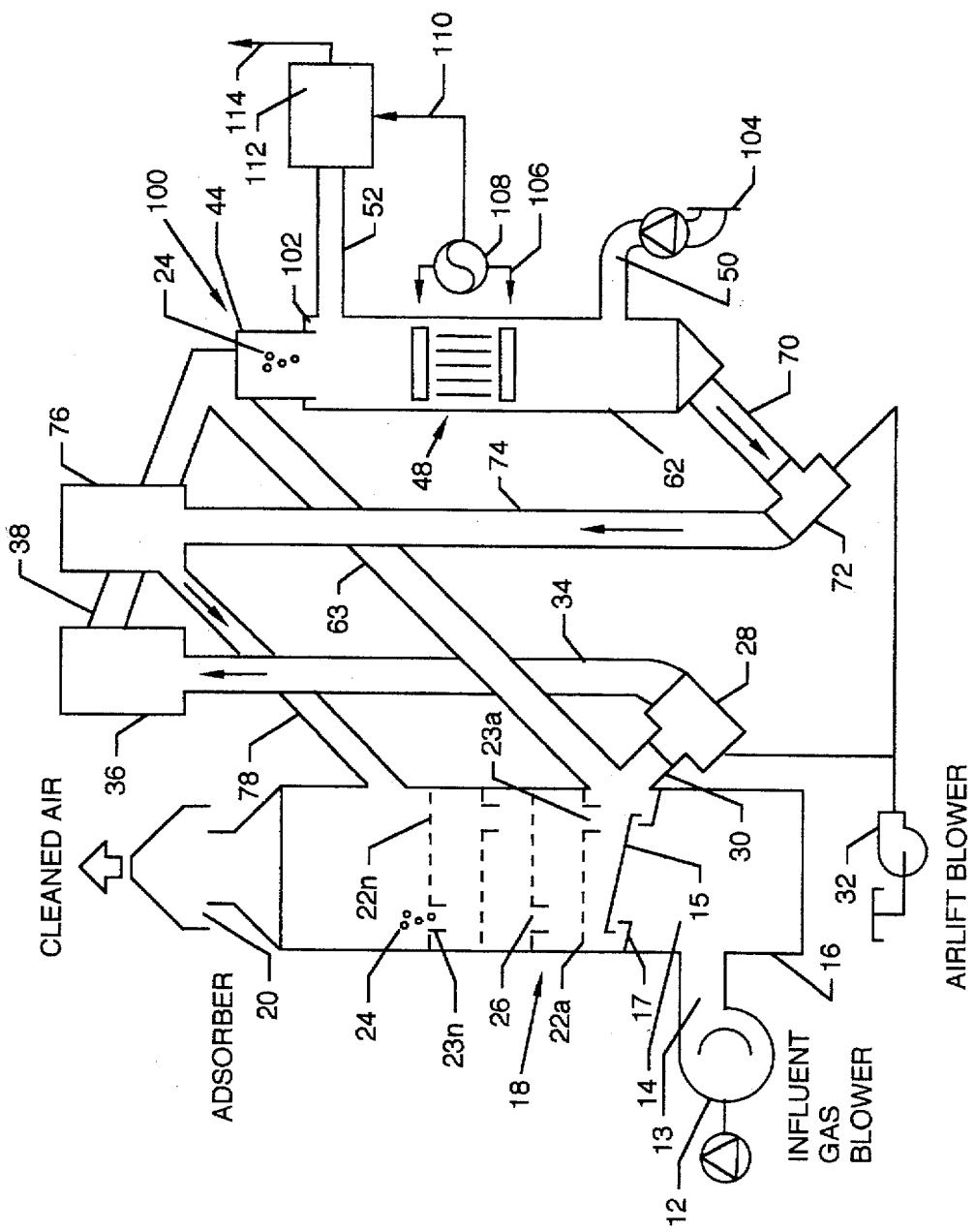
FIG. 3 illustrates a variation of FIG. 1 in which the desorbate is destroyed using ultraviolet light and ozone (UV-ozonation).

FIG. 3, a second alternative embodiment, illustrates the fluid bed adsorber 18, the basic structure of the moving bed desorber 40 which is now designated and defined as a moving bed reaction desorber vessel 100, and the transfer pipes 34 and 74 and associated components, in conjunction with the introduction of ozone and ultraviolet light to destroy the concentrated solvent in the synthetic pyrolized adsorbent pellets 24 within the reaction desorber vessel 100. The reaction vessel 100 includes a large canister 102 in lieu of the heat exchanger 46 of previous FIGS.; heat transfer device 48 is not included nor used in this embodiment.

In the moving bed reaction desorber vessel 100, the adsorbent pellets 24 flow downwardly through the large canister 102 as a packed bed. The flow of adsorbent pellets 24 in moving bed reaction desorber vessel 100 can be either pulsed or continuous, depending upon specific process requirements.

A controlled flow of ozone 104 is introduced into the bottom of the moving bed reaction desorber vessel 100 by way of pipe 50. Simultaneously, ultraviolet light 106 is introduced to moving bed reaction vessel 100 from ultraviolet light source 108. The combination of ultraviolet light 106 and ozone 104 in the moving bed reaction desorber vessel 100 destroys the concentrated gaseous desorbent solvent 52 in situ in the synthetic pyrolized adsorbent pellets 24.

The gaseous reaction products, unreacted ozone, and any traces of unreacted solvent leave reaction vessel 100 by way of desorbent pipe 52. As a final polishing step, a final reaction section 112 is included. The ultraviolet light source 108 provides ultraviolet energy 110 for final reaction section 112 ozonation of unreacted materials.

The gaseous products from the reaction sections are vented by way of vent pipe 114.

As an alternative, the concentrated solvent vapors can be desorbed in a heat exchanger, as previously described, and then the concentrated desorbate stream can be introduced to an ultraviolet/ozone reaction vessel for ex situ destruction of the concentrated solvent vapors.

THIRD ALTERNATIVE EMBODIMENT

Figure 4:
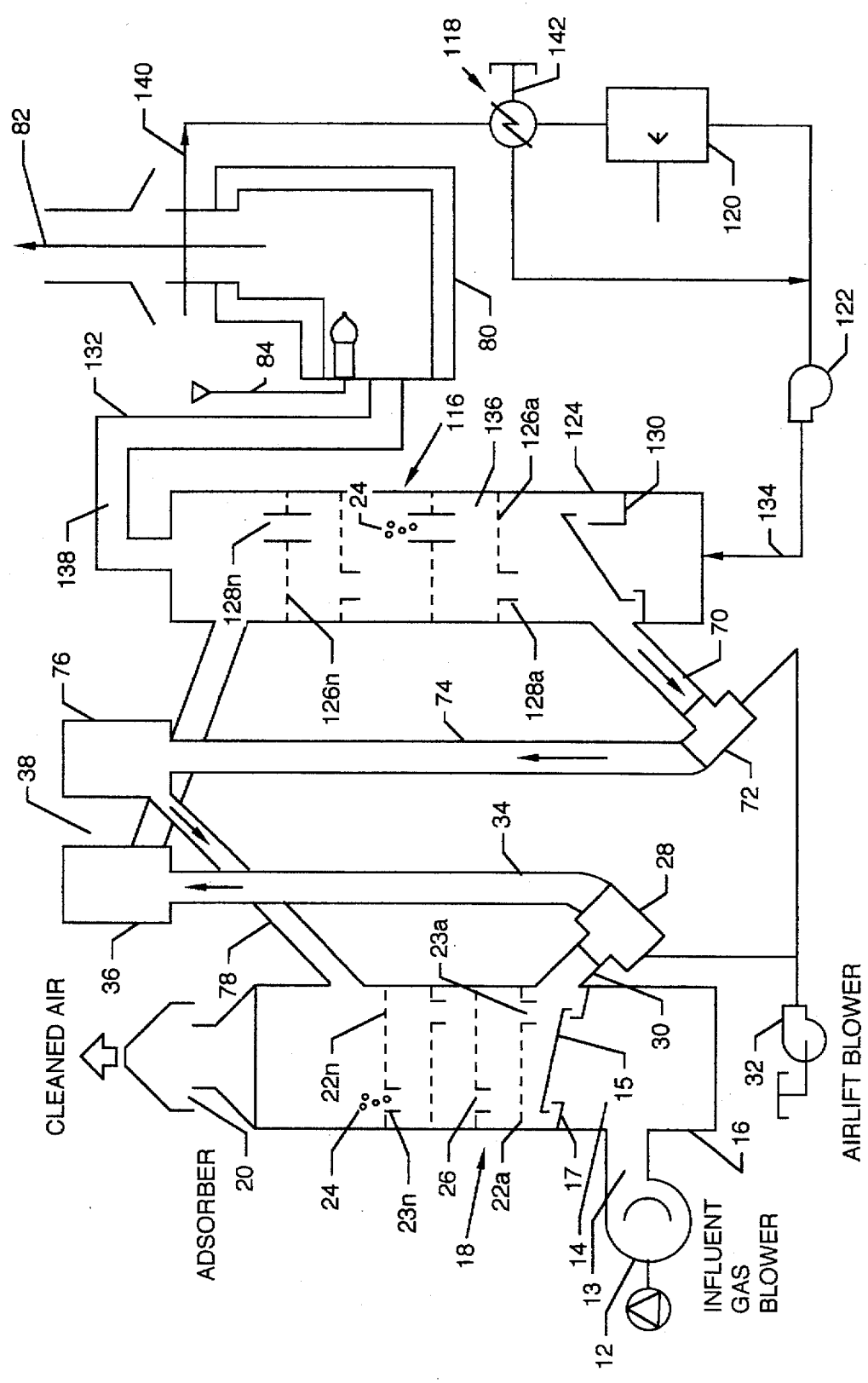
FIG. 4 illustrates a variation in which the moving bed desorber is replaced by a fluid bed desorber, followed by an oxidizer.

FIG. 4, a third alternative embodiment, illustrates the use of a fluid bed adsorber 18 and transfer pipes 34 and 74 and associated components previously described in FIG. 1, a small oxidizer 80 which replaces the condenser 56 previously illustrated in FIG. 1 each in conjunction with a fluid bed desorber 116 which replaces the moving bed desorber 40 previously described in FIG. 1. A heat exchanger 118, a water injector 120, and an air lift blower 122 are also included. The fluid bed desorber 116 is similar in design to the fluid bed adsorber 18, but is smaller in design than the fluid bed adsorber 18. However, the adsorbent pellets 24 in the adsorber 18 collect contaminated process gas particles 14 from the contaminated process air/gas stream 13; in the fluid bed desorber, conditioned hot stripping gas 136 removes concentrated solvent from the adsorbent pellets 24. The size ratio of the fluid bed adsorber 18 to the fluid bed desorber 116 determines the concentration ratio of the desorbed VOC stream.

The fluid bed desorber 116 includes a lower region 124, sieve trays 126a–126n, passageways 128a–128n through sieve trays 126a–126n respectively, a gravity feed slanted bottom plate 130, and a desorbate line 132 connected to the top of the fluid bed desorber 116 and the oxidizer 80.

The cross sectional area of the fluid bed desorber 116 is designed to be some fraction of the moving bed adsorber 18. Fluid bed desorber 116 gas flow is therefore a fraction of the flow of contaminated gas particles inputted to adsorber 18. This provides a mechanism to reduce the gas for final treatment, and increase the solvent vapor concentration correspondingly, as compared to the full process stream being treated.

Conditioned hot stripping gas 134 tempered by any one of or a combination of two or more of the oxidizer 80, the heat exchanger 118 or the water injector 120 is introduced to the fluid bed desorber lower region 124. This hot stripping gas 134 flows upward through the sieve trays 126a–126n. The pyrolized synthetic adsorbent pellets 24 containing concentrated solvent vapors are distributed evenly on the sieve trays 126a–126n. The upward flow of hot stripping gas 134 suspends the adsorbent pellets 24 in a moving or fluidized bed 136.

As the hot stripping gas 134 passes upwardly through the adsorbent pellets 24 in the moving or fluidized bed 136, concentrated gaseous desorbate solvent vapor is stripped from the adsorbent pellets 24. This concentrated gaseous desorbate stream 138 is carried out of the fluid bed desorber 116 by way of desorbate pipe 132. The concentrated gaseous desorbate stream 138 is piped to oxidizer 80. In the oxidizer 80, the concentrated gaseous desorbate vapor 138 is destroyed. Supplemental fuel 84 can be added, if the heat value of the concentrated gaseous desorbate solvent vapor 138 cannot maintain sufficient oxidizer temperature. As an added feature, the oxygen content of flue gas 82 can be controlled by modulating the combustion air source of oxidizer 80.

The heat produced in oxidizer 80 is used to provide energy for fluid bed desorber 116. Flue gas 82 is the heat transfer source. Flue gas energy 140 extracted from the flue gas 82 can be utilized and/or controlled by any of the following means, as stand alone options, or in any combination of options collectively:

Flue gas 82 can be used directly as hot stripping gas 134. To do so, the temperature must be controlled using one or more of the options shown.

(1) Heat exchanger 118 can be used. This can be a gas-to-gas heat exchanger. It can also be a liquid cooled heat exchanger, with recovery of thermal energy for other uses, including heating of carrier gas.

(2) Water injection chamber 120 can be used to control or condition the temperature of the hot gas 134 and to inert hot stripping gas 134.

(3) As an option, ambient air 142 can be heated using flue gas energy 140. This can be done through heat exchanger 118, the heat exchanger 118 options functioning as described above, directly or indirectly.

(4) As another option, ambient air 142 can be blended with flue gas energy 140 directly. The hot stripping gas 134 temperature is controlled by the blending ratio.

(5) Any combination of the above can be utilized to provide hot stripping gas 134 at an acceptable temperature, and level of oxygen, as specific applications mandate.

Various modifications can be made to the present invention without departing from the apparent scope hereof.

I claim:

1. A process for controlling volatile organic compounds in a gaseous stream, the process comprising the steps of:

a. providing an adsorber vessel (18), having a gas inlet port (13) and a gas exit vent (20), defining therebetween a generally upward directed gas flow path through the adsorber vessel (18), and a bead input port (78) and a bead output drain port (30), defining therebetween a generally downward directed bead flow path, said bead flow path arranged generally counter to the generally upward directed gas flow path;

b. providing a desorber (40), having a bead inlet (38) and a bead discharge (70), defining a generally downward bead path therebetween and a carrier gas inlet (50) and a carrier gas outlet (52), defining therebetween a generally upward directed carrier gas flow path, said carrier gas flow path arranged generally counter to the downward directed bead path;

c. providing a first bead transfer supplying the bead inlet (78) of the adsorber (20) from the bead outlet pipe (70) of the moving bed desorber (40);

d. providing a second bead transfer supplying the bead inlet pipe of the desorber (40) from the bead outlet pipe of the adsorber (20);

e. providing spherical, pyrolized, synthetic adsorbent beads;

f. directing the gaseous stream bearing the volatile organic compounds to be controlled into the gas inlet port (13);

g. adsorbing the volatile organic compounds in the gaseous stream to the beads;

h. transferring the beads to the desorber (40) to place the volatile organic compounds in a carrier gas stream; and, i. eliminating the volatile organic compounds from the carrier gas stream.

2. The process of claim 1 and wherein the step of eliminating the volatile organic compounds includes condensation from the carrier gas.

3. The process of claim 1 and wherein the step of eliminating the volatile organic compounds includes oxidation from the carrier gas.

4. The process of claim 3 and wherein the process further includes the step of reclaiming energy from the oxidation step for use in the desorption step.

5. A process for controlling volatile organic compounds in a gaseous stream, the process comprising the steps of:

a. providing an adsorber vessel (18), having a gas inlet port (13) and a gas exit vent (20), defining therebetween a generally upward directed gas flow path through the adsorber vessel (18), and a bead input port (78) and a bead output drain port (30), defining therebetween a generally downward directed bead flow path, said bead flow path arranged generally counter to the generally upward directed gas flow path;

b. providing a desorber (40), having a bead inlet (38) and a bead discharge (70), defining a generally downward bead path therebetween and a carrier gas inlet (50) and a carrier gas outlet (52), defining therebetween a generally upward directed carrier gas flow path, said carrier gas flow path arranged generally counter to the downward directed bead path;

c. providing a first bead transfer supplying the bead inlet (78) of the adsorber (20) from the bead outlet pipe (70) of the moving bed desorber (40);

d. providing a second bead transfer supplying the bead inlet pipe of the desorber(40) from the bead outlet pipe of the adsorber (20);

e. providing spherical, pyrolized, synthetic adsorbent beads;

f. directing the gaseous stream bearing the volatile organic compounds to be controlled into the gas inlet port 13;

g. adsorbing the volatile organic compounds in the gaseous stream to the beads;

h. transferring the beads to the desorber (40) to place the volatile organic compounds in a carrier gas stream; and, i. eliminating the volatile organic compounds from the carrier gas stream by destruction by exposure to UV and ozone.

6. The process of claim 5 and wherein the destruction by UV and ozone occurs within the desorber.

7. A volatile organic compound control comprising:

a. an adsorber vessel (18), having a contaminated process gas inlet port (13) and a scrubbed gas exit vent (20), defining therebetween a generally upward directed gas flow path through the adsorber vessel (18), and a bead input port (78) and a bead output drain port (30), defining therebetween a generally downward directed bead flow path, said bead flow path arranged generally counter to the generally upward directed gas flow path;

b. a moving bed desorber (40), having a bead inlet (38) and a bead discharge (70), defining a generally downward bead path therebetween and a carrier gas inlet (50) and a carrier gas outlet (52), defining therebetween a generally upward directed carrier gas flow path, said carrier gas flow path arranged generally counter to the downward directed bead path;

c. means for volatile organic compound elimination connected to the carrier gas outlet;

d. first bead transfer means supplying the bead inlet (78) of the adsorber (20) from the bead outlet pipe (70) of the moving bed desorber (40);

e. second bead transfer means supplying the bead inlet pipe of the desorber(40) from the bead outlet pipe of the adsorber (20); and, f. beads of synthetic pyrolized adsorbent in the bead paths.

8. The volatile organic compound control of claim 7 and wherein the beads are partially suspended in the upward flow gas path of the adsorber vessel (18).

9. The volatile organic compound control of claim 7 and wherein the adsorber vessel (18) further includes at least one internal generally horizontally disposed sieve tray (22), the sieve tray (22) having at least one bead passageway (23) therethrough.

10. The volatile organic compound control of claim 9 and wherein the adsorber vessel (18) further includes:

a. at least one second internal generally horizontally disposed sieve tray, spaced vertically apart from the aforementioned internal generally horizontally disposed sieve tray, the second tray having at least one bead passageway (23) horizontally displaced from the passageway in the aforementioned internal generally horizontally disposed sieve tray; and, b. a gravity feed slanted plate (17) directing beads to the bead output drain port (30).

11. The volatile organic compound control of claim 7 and wherein the means for volatile organic compound elimination connected to the carrier gas outlet include a condenser (56).

12. The volatile organic compound control of claim 7 and wherein the means for volatile organic compound elimination connected to the carrier gas outlet include an oxidizer (80).

13. The volatile organic compound control of claim 12 and wherein the oxidizer produces heat and the heat is furnished to the moving bed desorber (40).

14. A volatile organic compound control comprising:

a. an adsorber vessel (18), having a contaminated process gas inlet port (13) and a scrubbed gas exit vent (20), defining therebetween a generally upward directed gas flow path through the adsorber vessel (18), and a bead input port (78) and a bead output drain port (30), defining therebetween a generally downward directed bead flow path, said bead flow path arranged generally counter to the generally upward directed gas flow path;

b. a moving bed desorber vessel (100), having a bead inlet (38) and a bead discharge (70), defining a generally downward bead path therebetween and a carrier gas inlet (50) and a carrier gas outlet (52), defining therebetween a generally upward directed carrier gas flow path, said carrier gas flow path arranged generally counter to the downward directed bead path, and a UV light source (108) arranged to impinge on the bead and carrier gas paths;

c. an ozone supply connected to the carrier gas inlet (50);

d. first bead transfer means supplying the bead inlet (78) of the adsorber (20) from the bead outlet pipe (70) of the moving bed desorber (40); and, e. second bead transfer means supplying the bead inlet pipe of the desorber (40) from the bead outlet pipe of the adsorber (20).

15. The volatile organic compound control of claim 14 and further including a final reaction section (112) connected to the carrier gas outlet (52), the final reaction section (112) including a UV light source.

16. The volatile organic compound control of claim 15 and wherein the UV light source (108) is common to the moving bed reaction desorber vessel (100) and the final reaction section (112).

17. A volatile organic compound control, comprising:

a. an adsorber vessel (18), having a contaminated process gas inlet port (13) and a scrubbed gas exit vent (20), defining therebetween a generally upward directed gas flow path through the adsorber vessel (18), and a bead input port (78) and a bead output drain port (30), defining therebetween a generally downward directed bead flow path, said bead flow path arranged generally counter to the generally upward directed gas flow path;

b. a fluid bed desorber (116), having a bead inlet (38) and a bead discharge (70), defining a generally downward bead path therebetween and a stripper gas inlet (134) and a stripper gas outlet (132), defining therebetween a generally upward directed stripper gas flow path, said stripper gas flow path arranged generally counter to the downward directed bead path, the fluid bed desorber (116) having a cross-sectional area less than the cross-sectional area of the fluid bed adsorber (18);

c. an oxidizer (80) connected to the stripper gas outlet (132), the oxidizer (80) including an energy extraction means for reclaiming a portion of energy generated by oxidizer (80) and means for redirecting the reclaimed energy to the stripper gas input (134);

d. first bead transfer means supplying the bead inlet (78) of the adsorber (20) from the bead outlet pipe (70) of the moving bed desorber (40);

e. second bead transfer means supplying the bead inlet pipe of the desorber (40) from the bead outlet pipe of the adsorber (20); and, f. beads of pyrolized synthetic adsorbent in the bead paths.

18. The volatile organic compound control of claim 17 and wherein the means for redirecting energy is a heat exchanger (118).

* * * * *